US012662614B2

(12) United States Patent
Shiga

(10) Patent No.: US 12,662,614 B2
(45) Date of Patent: Jun. 23, 2026

(54) ADHESIVE RESIN COMPOSITION AND FILM

(71) Applicant: MITSUI CHEMICALS, INC., Tokyo (JP)

(72) Inventor: Ryohei Shiga, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 91 days.

(21) Appl. No.: 18/683,302

(22) PCT Filed: Aug. 17, 2022

(86) PCT No.: PCT/JP2022/031049
§ 371 (c)(1),
(2) Date: Feb. 13, 2024

(87) PCT Pub. No.: WO2022/172766
PCT Pub. Date: Aug. 18, 2022

(65) Prior Publication Data
US 2024/0368441 A1 Nov. 7, 2024

(30) Foreign Application Priority Data
Aug. 18, 2021 (JP) ................................. 2021-133539

(51) Int. Cl.
*C09J 151/06* (2006.01)
*C09J 7/30* (2018.01)
(52) U.S. Cl.
CPC .............. *C09J 151/06* (2013.01); *C09J 7/30* (2018.01); *C09J 2203/33* (2013.01); *C09J 2301/30* (2020.08); *C09J 2451/00* (2013.01)
(58) Field of Classification Search
CPC ........ C09J 151/06; C09J 7/30; C09J 2203/33; C09J 2301/30; C09J 2451/00; C09J 123/04; C09J 123/26; C09J 7/35; B32B 7/12; B32B 27/08; B32B 27/00; B32B 27/32; H01M 50/131; H01M 50/121; H01M 50/129; H01M 50/105; H01M 50/188; H01M 50/193; H01M 50/198; H01M 50/595; H01M 10/0525; H01M 50/124; H01M 50/183; C08L 2205/03; C08L 23/04; C08L 23/20; C08L 23/26; C08L 51/06; Y02E 60/10
See application file for complete search history.

(56) References Cited

U.S. PATENT DOCUMENTS 4,487,885 A * 12/1984 Adur ...................... C09J 151/06
525/74

FOREIGN PATENT DOCUMENTS

| EP | 0 434 386 B1 | 3/1999 |
| JP | 2007-273398 A | 10/2007 |
| JP | 2014-157727 A | 8/2014 |
| JP | 2014216345 A * | 11/2014 |

OTHER PUBLICATIONS

JP2014216345A Machine Translation of Description (Year: 2025).*

* cited by examiner

*Primary Examiner* — Cynthia L Schaller
(74) *Attorney, Agent, or Firm* — Foley & Lardner LLP

(57) ABSTRACT

An adhesive resin composition, including from 60 to 95 parts by mass of an ethylenic polymer (A) including a modified ethylenic polymer (a-2) obtained by modifying at least one polymer (a-1) selected from the group consisting of an ethylene homopolymer and a copolymer of ethylene and at least one α-olefin selected from α-olefins having from 3 to 20 carbon atoms, with an unsaturated carboxylic acid and/or a derivative thereof, and from 5 to 40 parts by mass of a butene-based polymer (B) having 80 mol % or more of a structural unit derived from 1-butene, provided that the total content of the polymer (A) and the polymer (B) is 100 parts by mass, wherein the MER (190° C. and a load of 2.16 kg) is from 1 to 20 g/10 minutes.

7 Claims, No Drawings

ADHESIVE RESIN COMPOSITION AND FILM

TECHNICAL FIELD

The present invention relates to an adhesive resin composition and a film using the same.

BACKGROUND ART

In recent years, the field of lithium ion batteries for use has expanded to involve portable electronic devices and automobiles, for example. For packaging materials of lithium ion batteries, laminated packaging materials in which a composite of an aluminum foil and a resin film stacked thereon is formed in bag shape, have been used instead of conventional metal cans, in view of weight saving, degree of freedom in battery shape, and miniaturization of the batteries.

Moreover, in lithium ion batteries, edges of metal foils are heat-sealed together by an adhesive polyolefin film to bond them together and ensure their insulation.

Patent Literature 1 describes a packaging material for batteries in which a substrate layer, a metal foil layer on at least one side of which a chemical conversion treatment layer is provided, an acid modified polyolefin layer, a heat sealing layer including a high melting point polypropylene layer and an ethylene propylene random copolymer layer, are at least sequentially stacked, wherein the high melting point polypropylene layer is arranged on a side of the metal foil layer closer than the ethylene propylene random copolymer layer is, and has a melting point of 150° C. or higher.

CITATION LIST

Patent Literature

Patent Literature 1: JP2007-273398A

SUMMARY OF INVENTION

Technical Problem

Packaging films for lithium ion batteries have a problem of decreased adhesive strength between an adhesive polyolefin film and a metal foil upon immersion in an electrolytic solution, and it is necessary that this adhesive strength does not decrease (hereinafter referred to as "resistance to electrolytic solution"); however, the packaging film for batteries described in Patent Literature 1 has insufficient resistance to electrolytic solution.

In lithium ion batteries, there is also an adhesive polyolefin film called an electrode sealing material, which bonds electrodes together, and this adhesive polyolefin film is also required for having resistance to electrolytic solution.

An object of the present invention is to provide an adhesive resin composition capable of forming a packaging film for batteries with excellent resistance to electrolytic solution and an electrode sealing material for lithium ion batteries, as well as a monolayer or multilayer film that exhibits excellent resistance to electrolytic solution when used in the packaging film for batteries and the electrode sealing material for lithium ion batteries.

Solution to Problem

The present invention relates to the following [1] to [8], for example:

[1]

An adhesive resin composition, including:

from 60 to 95 parts by mass of an ethylenic polymer (A) comprising a modified ethylenic polymer (a-2) obtained by modifying at least one polymer (a-1) selected from the group consisting of an ethylene homopolymer and a copolymer of ethylene and at least one α-olefin selected from α-olefins having from 3 to 20 carbon atoms, with an unsaturated carboxylic acid and/or a derivative thereof; and from 5 to 40 parts by mass of a butene-based polymer (B) having 80 mol % or more of a structural unit derived from 1-butene, provided that the total content of the polymer (A) and the polymer (B) is 100 parts by mass, wherein the melt flow rate as measured at 190° C. and under a load of 2.16 kg in accordance with ASTM D1238 is in a range of from 1 to 20 g/10 minutes.

[2]

The adhesive resin composition according to [1], wherein the melt flow rate of the ethylenic polymer (A), measured at 190° C. and under a load of 2.16 kg in accordance with ASTM D 1238 is from 0.1 to 10 g/10 minutes.

[3]

The adhesive resin composition according to [1] or [2], wherein the unsaturated carboxylic acid and/or a derivative thereof is maleic anhydride.

[4]

The adhesive resin composition according to any of [1] to [3], wherein the content of structures derived from an unsaturated carboxylic acid and/or a derivative thereof in the adhesive resin composition is from 0.05 to 1% by mass in terms of the content of structure derived from maleic anhydride.

[5]

A monolayer or multilayer film comprising at least one layer comprising the adhesive resin composition according to any of [1] to [4].

[6]

The monolayer or multilayer film according to [5], which is a packaging film for batteries.

[7]

The monolayer or multilayer film according to [5], which is an electrode sealing material for lithium ion batteries.

[8]

An adhesive resin composition, including from 60 to 95 parts by mass of an ethylenic polymer (A') being a modified ethylenic polymer (a-2) in which at least one polymer (a-1) selected from the group consisting of an ethylene homopolymer and a copolymer of ethylene and at least one α-olefin selected from α-olefins having from 3 to 20 carbon atoms, is modified with an unsaturated carboxylic acid and/or a derivative thereof, wherein a melt flow rate as measured at 190° C. and under a load of 2.16 kg in accordance with ASTM D1238 is in a range of from 0.1 to 10 g/10 minutes, and from 5 to 40 parts by mass of a butene-based polymer (B) having 80 mol % or more of a structural unit derived from 1-butene, provided that a total content of the polymer (A') and the polymer (B) is 100 parts by mass.

Advantageous Effects of Invention

According to the adhesive resin composition of the present invention, it is possible to form a packaging film for batteries with excellent resistance to electrolytic solution and an electrode sealing material for lithium ion batteries.

The monolayer or multilayer film according to the present invention exhibits excellent resistance to electrolytic solution when used as a packaging film for batteries and an electrode sealing material for lithium ion batteries.

DESCRIPTION OF EMBODIMENTS

The present invention will be described in more detail below.

Adhesive Resin Composition

The adhesive resin composition according to one embodiment of the present invention contains an ethylenic polymer (A) and a butene-based polymer (B).

The adhesive resin composition according to the other embodiment of the present invention contains an ethylenic polymer (A') and a butene-based polymer (B).

Ethylenic Polymer (A)

The ethylenic polymer (A) is a polymer (resin) containing a modified ethylenic polymer (a-2) obtained by modifying at least one polymer (a-1) selected from the group consisting of an ethylene homopolymer and a copolymer of ethylene and at least one α-olefin selected from α-olefins having from 3 to 20 carbon atoms, with an unsaturated carboxylic acid and/or a derivative thereof.

Ethylenic Polymer (A')

The ethylenic polymer (A') is the modified ethylenic polymer (a-2), which is a polymer (resin) having a melt flow rate of from 0.1 to 1 0 g/10 minutes, measured at 190° C. and under a load of 2.16 kg in accordance with ASTM D1238.

Polymer (a-1)

The polymer (a-1) is at least one polymer selected from the group consisting of an ethylene homopolymer and a copolymer of ethylene and at least one α-olefin selected from α-olefins having from 3 to 20 carbon atoms.

The copolymer of ethylene and at least one α-olefin selected from α-olefins having from 3 to 20 carbon atoms preferably contains from 50 to 99 mol % and more preferably from 60 to 99 mol %, of a structural unit derived from ethylene, and preferably contains from 1 to 50 mol % and more preferably from 1 to 40 mol % (provided that the sum of the structural units is 100 mol %), of a structural unit derived from the α-olefin having from 3 to 20 carbon atoms.

Examples of the α-olefins include propylene, 1-butene, 1-pentene, 1-hexene, 4-methyl-1-pentene, 1-octene, 1-decene, 1-dodecene, 1-tetradecene, 1-hexadecene, 1-octadecene, and 1-eicosene, and the propylene, 1-butene, 1-hexene, and 1-octene are preferable among them.

The α-olefin may be one kind or two or more kinds.

Examples of the polymer (a-1) can include a polyethylene, an ethylene·propylene copolymer, and an ethylene·propylene·C4-C20 α-olefin copolymer.

Examples of methods of producing the polymer (a-1) are not particularly limited and include a high-pressure method or well-known methods using well-known catalysts, such as a Ziegler-Natta catalyst and a metallocene catalyst. The polymer (a-1) may be a commercially available product.

Modification

The ethylenic polymer (A) contains a modified ethylenic polymer (a-2) obtained by modifying the polymer (a-1) with an unsaturated carboxylic acid and/or a derivative thereof.

The ethylenic polymer (A') is the modified ethylenic polymer (a-2) and has a melt flow rate of from 0.1 to 10 g/10 minutes as measured at 190° C. and under a load of 2.16 kg in accordance with ASTM D1238.

Examples of the unsaturated carboxylic acid and/or a derivative thereof can include an unsaturated compound having one or more carboxy groups in one molecule, an ester of a compound having a carboxy group and an alkyl alcohol, an unsaturated compound having in one molecule, one or more structures represented by R—CO—O—CO—R' (each of R and R' is independently a hydrocarbon group), for example. Examples of the unsaturated group that the unsaturated compound has, include a vinyl group, a vinylene group, and an unsaturated cyclic hydrocarbon group. The unsaturated carboxylic acid and/or a derivative thereof may be used singly or in combinations of two or more kinds thereof. Among them, an unsaturated dicarboxylic acid and an acid anhydride thereof are preferred, and maleic acid, nadic acid and acid anhydrides thereof are particularly preferred.

The amount of structures derived from an unsaturated carboxylic acid and/or a derivative thereof in the ethylenic polymer (A) and the amount of structures derived from an unsaturated carboxylic acid and/or a derivative thereof in the ethylenic polymer (A') are both preferably from 0.01 to 5% by mass, more preferably from 0.05 to 3.5% by mass, still more preferably from 0.05 to 2.0% by mass, and particularly preferably from 0.05 to 1% by mass (the amount of ethylenic polymer (A) is 100% by mass), in terms of the amount of structure derived from maleic anhydride (i.e., assuming that the unsaturated carboxylic acid and/or a derivative thereof is maleic anhydride). Within the above range of the amount of structures derived from the unsaturated carboxylic acid and/or a derivative thereof, a resin composition excellent in balance between formability and adhesiveness can be obtained.

A method of obtaining the polymer (a-2) by modifying the polymer (a-1) with an unsaturated carboxylic acid and/or a derivative thereof is not particularly limited, and can employ a conventionally known graft polymerization method such as a solution method or a melt kneading method. For example, a method of melting the polymer (a-1) and adding thereto an unsaturated carboxylic acid and/or a derivative thereof to undergo graft reaction, or a method of dissolving the polymer (a-1) in a solvent to prepare solution and adding thereto an unsaturated carboxylic acid and/or a derivative thereof to undergo graft reaction, for example, can be employed.

MFR

A melt flow rate (hereinafter also referred to as "MFR") of the ethylenic polymer (A) (in accordance with ASTM D1238, 190° C., 2.16 kg load) is preferably in a range of from 0.1 to 15 g/10 minutes, more preferably from 0.5 to 12 g/10 minutes, still more preferably from 1 to 10 g/10 minutes, and even still more preferably from 1 to 6 g/10 minutes. The MFR of the ethylenic polymer (A') (in accordance with ASTM D1238, 190° C., 2.16 kg load) is in a range of from 0.1 to 10 g/10 minutes, more preferably from 0.5 to 8 g/10 minutes, still more preferably from 1 to 10 g/10 minutes, and even still more preferably from 1 to 6 g/10 minutes. Within the above range of the MFR, the composition of the present invention is excellent in balance between flexibility and a mechanical strength, and has a high adhesive strength.

The density of the ethylenic polymer (A) and the density of the ethylenic polymer (A') (in accordance with JIS K7112) are both preferably from 0.87 to 0.97 g/cm$^3$, more preferably from 0.90 to 0.93 g/cm$^3$, and still more preferably from 0.91 to 0.92 g/cm$^3$.

The content of the modified ethylenic polymer (a-2) in the ethylenic polymer (A) is preferably from 10 to 100% by mass, more preferably from 15 to 100% by mass, and still more preferably from 15 to 25% by mass.

The ethylenic polymer (A) may contain an ethylenic polymer other than the modified ethylenic polymer (a-2). Examples of the ethylenic polymer other than the modified ethylenic polymer (a-2) include, for example, the unmodified polymer (a-1).

Butene-Based Polymer (B)

The butene-based polymer (B) (hereinafter also simply referred to as "polymer (B)") is a polymer (resin) having 80 mol % or more of a structural unit derived from 1-butene.

Examples of the polymer (B) include, for example, a 1-butene homopolymer and a copolymer of 1-butene and an α-olefin having from 2 to 24 carbon atoms (excluding 1-butene).

The α-olefin may be one kind or two or more kinds.

From the viewpoint of compatibility with the ethylenic polymer (A), the α-olefin is preferably ethylene, propylene, 1-hexene, and 1-octene, and more preferably ethylene and propylene.

The content of a structural unit derived from 1-butene in the polymer (B) is 80 mol % or more, and preferably from 85 to 99 mol % and more preferably from 90 to 99 mol % from the viewpoint of superior adhesiveness, for example.

In the case of the polymer (B) having a structural unit derived from the α-olefin, the content of structural unit derived from the α-olefin in the polymer (B) is usually 20 mol % or less, preferably from 1 to 15 mol %, and more preferably from 1 to 10 mol %.

The MFR of the polymer (B) measured at 190° C. and under a load of 2.16 kg in accordance with ASTM D1238, is preferably from 0.1 to 100 g/10 minutes and more preferably from 0.5 to 50 g/10 min in terms of excellent formability.

The density of the polymer (B) measured based on JIS K7112, is preferably from 0.87 to 0.92 g/cm$^3$ and more preferably from 0.88 to 0.91 g/cm$^3$.

A molecular weight distribution (Mw/Mn) of the polymer (B) is preferably from 1.5 to 5.0 and more preferably from 1.8 to 4.0.

Examples of methods of producing the polymer (B) are not particularly limited and include well-known methods using well-known catalysts, such as a Ziegler-Natta catalyst and a metallocene catalyst. The polymer (B) is also preferably a crystalline polymer, and in a case in which it is a copolymer of the 1-butene and an α-olefin having 2 to 24 carbon atoms, the polymer (B) may be a random copolymer or a block copolymer. The polymer (B) may be a commercially available product.

Modification

The polymer (B) may be partially or totally modified with an unsaturated carboxylic acid and/or a derivative thereof or the polymer (B) needs not to be modified.

The details of the unsaturated carboxylic acid and/or a derivative thereof are as described above.

In the case of the polymer (B) being modified, the amount of structures derived from an unsaturated carboxylic acid and/or a derivative thereof in the polymer (B) is preferably from 0.01 to 5% by mass, more preferably from 0.05 to 3.5% by mass, and still more preferably from 0.05 to 1% by mass wherein the amount of polymer (B) is 100% by mass, in terms of the amount of structure derived from maleic anhydride (i.e., assuming that the unsaturated carboxylic acid and/or a derivative thereof is maleic anhydride). Within the above range of the amount of structures derived from the unsaturated carboxylic acid and/or a derivative thereof, a resin composition excellent in balance between formability and adhesiveness can be obtained.

A method of modifying an unmodified polymer (B) with an unsaturated carboxylic acid and/or derivatives thereof is not particularly limited, and examples of the method include the same method as that of modifying the polymer (a-1) to obtain the polymer (a-2) described above.

Optional Component

The adhesive resin composition of the present invention may contain an additive to the extent that effects of the present invention are not impaired. Examples of the additives include an antioxidant, an ultraviolet ray absorber, a neutralizer, a nucleating agent, a light stabilizer, an antistatic agent, an antiblocking agent, a lubricant, an odor adsorbent, an antibacterial agent, a moisture absorbent, pigments, an inorganic or organic filler, and a polymer other than the ethylenic polymer (A) and the butene-based polymer (B).

Adhesive Resin Composition

The contents of ethylenic polymer (A) and butene-based polymer (B) in the adhesive resin composition of the present invention are from 60 to 95 parts by mass and from 5 to 40 parts by mass, respectively, preferably from 65 to 90 parts by mass and from 10 to 35 parts by mass, respectively, and more preferably from 70 to 85 parts by mass and from 15 to 30 parts by mass, respectively, as the total content of ethylenic polymer (A) and butene-based polymer (B) being 100 parts by mass.

Within the ranges of the contents of the components described above, the resin composition of the present invention has high adhesiveness in particular that after immersion in an electrolytic solution, and a film containing the layer obtained from the composition of the present invention hardly results in reducing adhesiveness due to the immersion in an electrolytic solution.

The content of polymer (B) in the adhesive resin composition exceeding 40 parts by mass cannot provide a desired initial adhesive strength.

The MFR (in accordance with ASTM D1238, 190° C., 2.16 kg load) of the adhesive resin composition of the present invention is from 1 to 20 g/10 minutes, preferably from 1 to 15 g/10 minutes, and more preferably from 1 to 10 g/10 minutes. The MFR exceeding 20 g/10 minutes results in large wall thinning of the composition upon heat sealing and allows the adhesive layer formed from the composition to be thinner, thereby reducing its adhesive strength, and the MFR below 1 g/10 minutes lowers wettability to an adherend, thereby reducing the adhesive strength.

The density (in accordance with JIS K7112) of the adhesive resin composition of the present invention is preferably from 0.85 to 0.98 g/cm$^3$, more preferably from 0.90 to 0.93 g/cm$^3$, and still more preferably from 0.90 to 0.92 g/cm$^3$.

The amount of structures derived from the unsaturated carboxylic acid and/or a derivative thereof (graft modification amount) in the adhesive resin composition of the present invention, is preferably from 0.05 to 1% by mass and more preferably from 0.10 to 1% by mass, in terms of the amount of structure derived from maleic anhydride (i.e., assuming that the unsaturated carboxylic acid and/or a derivative thereof is maleic anhydride).

The adhesive resin composition of the present invention can be produced by conventionally known methods, except that the ethylenic polymer (A) or the ethylenic polymer (A') and the butene-based polymer (B) described above are used as raw materials. For example, the components described above can be melt kneaded to produce the resin composition.

Sea-Island Structure

The adhesive resin composition of the present invention forms a finely dispersed structure (so-called a sea-island structure), containing the ethylenic polymer (A) or the ethylenic polymer (A') in a continuous phase, and the butene-based polymer (B) that is dispersed in the continuous phase, in a dispersed phase. Formation of such a structure improves resistance to electrolytic solution of a layer composed of the adhesive resin composition. The reason for this is not necessarily clarified, but is presumed because trapping an electrolytic solution in the dispersed phase can inhibit the electrolytic solution from penetrating into an interface between a layer composed of the adhesive resin composition and a metal (hereinafter also referred to as "adhesive interface").

The polymer (a-1) also constitutes a continuous phase in the same manner as in the ethylenic polymer (A) and the ethylenic polymer (A').

The average particle size of the dispersed phase, as measured by the following method, is preferably from 0.001 to 10 μm. The upper limit value of the average particle size of the dispersed phase is more preferably 8 μm, still more preferably 6 μm, and particularly preferably 5 μm, and the lower limit value is preferably 0.09 μm.

Method of Measuring Average Particle Size

A test piece is ground with a microtome, for example, and the arbitrary cross-section obtained with an area of approximately 45 μm×75 μm or larger is analyzed by using a transmission electron microscope (for example, an H-7650 manufactured by Hitachi High-Technologies Corporation) under 3,000 times magnification. The analysis is carried out by binarization processing using image analysis software (for example, ImageJ).

From TEM photographs, regions occupied by a continuous phase and a dispersed phase are each identified.

In the case of a shape of the dispersed phase being a circle, the diameter is used as a particle size, and in the case of a shape of the dispersed phase being an ellipse, the length of the major axis is used as a particle size. Moreover, in the case of a shape of the dispersed phase other than a circle or an ellipse, the area of the dispersed phase is determined followed by determination of the diameter of a perfect circle with an area equal to the area of the dispersed phase, which is used as a particle size.

The average particle size of the dispersed phase of 0.001 μm or larger provides a sufficient cavitation effect and renders excellent resistance to electrolytic solution.

The dispersed phase having an average particle size of 10 μm or smaller does not interfere with adhesiveness of the continuous phase when the dispersed phase is present at an adhesive interface, whereby the composition of the present invention exhibits favorable adhesiveness.

In a region with an area of 10 μm×10 μm, randomly selected, of a cross section of a test piece upon measuring an average particle size of a dispersed phase of the adhesive resin composition of the present invention, a proportion of the number of dispersed phases with a particle size of from 0.001 to 5 μm in 80% or more of the total number of dispersed phases is preferably 80% or more, more preferably 85% or more, still more preferably 90% or more, particularly preferably 95% or more, and most preferably 100%. When the proportion is 80% or more, the composition has excellent adhesiveness.

Monolayer or Multilayer Film

The monolayer or multilayer film of the present invention is characterized in that it includes at least one layer containing the adhesive resin composition of the present invention as described above.

Examples of a specific aspect of the monolayer or multilayer film of the present invention include a multilayer film including at least one layer containing the adhesive resin composition of the present invention and at least the other layer which is a layer other than the layer containing the adhesive resin composition, wherein the layer containing the adhesive resin composition is in contact with the other layer, and a multilayer film including at least one layer containing the adhesive resin composition of the present invention and at least one layer selected from a metal-containing layer, a polyolefin layer, and a polar resin layer, wherein the layer containing the adhesive resin composition is in contact with a layer selected from at least one layer of the metal-containing layer, the polyolefin layer, or the polar resin layer.

Examples of the other layer include a metal-containing layer, a polyolefin layer and a polar resin layer.

Examples of the metal-containing layer include an aluminum layer (for example, an aluminum foil), a copper layer, and a stainless steel layer.

Examples of the polyolefin layer include a polypropylene layer, a poly(4-methyl-1-pentene) layer, and a polyethylene layer.

Examples of the polar resin layer include a polyamide layer, an EVOH layer, a PET layer, and a PBT layer.

The layer containing the adhesive resin composition of the present invention can be produced by forming, for example, melt extrusion forming, the adhesive resin composition of the present invention. Therefore, the monolayer or multilayer film of the present invention can be produced by a casting method, a blown method, and an extrusion lamination method, for example.

The monolayer or multilayer film of the present invention can be preferably used as a packaging film for batteries such as a packaging film for lithium ion batteries, or as an electrode sealing material for lithium ion batteries.

EXAMPLES

The present invention will be specifically described based on Examples below, however, the present invention is in no way limited to these Examples.

Method of Measuring Physical Properties

<Melt Flow Rate (MFR)>

MFRs of the ethylenic polymers, butene-based polymers, and adhesive resin compositions were measured according to ASTM D1238 under conditions of a temperature of 190° C. and a load of 2.16 kg. In a case in which plural kinds of ethylenic polymers are present in the composition, "MFR of ethylenic polymer (A)" refers to the value calculated by the logarithmic additive law.

<Density>

The density was measured in accordance with JIS K7112 (density gradient tube method).

In a case in which plural kinds of ethylenic polymers are present in the composition, a density value of the ethylenic polymer (A) is a value obtained by weighted-averaging the density values of the respective ethylenic polymers.

For example, in the case of an ethylenic polymer (A) containing A % by mass of an ethylenic polymer with a density value of x, based on the content of ethylenic polymer (A) in total and containing (100-A) % by mass of an ethylenic polymer with a density value of y, based on the content of ethylenic polymer (A) in total, the density value of the ethylenic polymer (A) is $$(x \times A + y \times 100 - A))/100.$$

The density is calculated in the same manner as in the case of three or more kinds of ethylenic polymers contained. The density of the ethylenic polymer (A') is also calculated in the same manner.

<Content Proportion of Structural Unit>

A content proportion of a structural unit derived from 1-butene and a content proportion of a structural unit derived from ethylene, in the butene-based copolymer, were determined by $^{13}$C-NMR using the following apparatus and conditions.

With a JEOL JECX400P nuclear magnetic resonance spectrometer, the conditions of using a mixed solvent of deuterated ortho-dichlorobenzene/deuterated benzene (80/20% by volume) as a solvent, sample concentration of 60 mg/0.6 mL, measurement temperature of 120° C., observation nucleus of $^{13}$C (100 MHZ), sequence of single-pulse proton decoupling, pulse width of 4.62 μsec (45° pulse), repetition time of 5.5 sec, cumulative number of 8000, and 29.73 ppm as the reference value of chemical shift, were employed.

<Graft Modification Amount>

The amount of structure derived from maleic anhydride (graft modification amount) was determined by measuring intensity of the peak at 1790 cm$^{-1}$ derived from the structure using an infrared absorption spectrometer and using a calibration curve preliminarily prepared.

Raw Materials

The polyolefins used in Examples and Comparative Examples are listed below. All of these polyolefins were prepared by polymerization according to the ordinary method and arbitrarily by graft modification with maleic anhydride.

PE-1: Polyethylene (MFR=4.0 g/10 minutes, density=0.90 g/cm$^3$, content of structure derived from maleic anhydride=0.4% by mass)

PE-2: Polyethylene (MFR=4.0 g/10 minutes, density=0.92 g/cm$^3$, content of structure derived from maleic anhydride=0.4% by mass)

PE-3: Polyethylene (MFR=4.0 g/10 minutes, density=0.92 g/cm$^3$, content of structure derived from maleic anhydride=1.5% by mass)

PE-4: Polyethylene (MFR=4.0 g/10 minutes, density=0.90 g/cm$^3$)

PE-5: Polyethylene (MFR=4.0 g/10 minutes, density=0.92 g/cm$^3$)

PE-6: Polyethylene (MFR=20 g/10 minutes, density=0.92 g/cm$^3$)

BER-1: Butene-ethylene copolymer (MFR=2.0 g/10 minutes, density=0.91/cm$^3$, 1-butene content 98.4 mol % and ethylene content 1.6 mol %)

Example 1

<Production of Composition 1>

A composition 1 was obtained by melt kneading 70 parts by mass of PE-1 and 30 parts by mass of BER-1 at 230° C. by using a single screw extruder.

<Production of Composite>

A film with a thickness of 100 μm was formed from the obtained composition 1 by using an extrusion forming machine provided with a T-die.

The resulting film was overlaid with an aluminum foil having a thickness of 200 μm and a width of 15 mm, and heat sealed by using a heat sealer under conditions of a sealing temperature of 130° C., sealing pressure of 0.2 MPa, and sealing time of 4 seconds to produce a composite (multilayer film). Two composites were produced.

<Composite Immersed in Electrolytic Solution>

One of the composites obtained was immersed in an electrolytic solution in which 1,000 ppm water was added to solvent of ethyl carbonate: diethyl carbonate=3:7, containing 1 mol/L LiPF$_6$, and the composite was allowed to stand at 85° C. for 1 week.

<Measurement of Adhesive Strength of Composite>

For the other composite obtained (composite immediately after the production) and a sample for measurement after immersion in the electrolytic solution (composite after immersion in the electrolytic solution), each adhesive strength (unit: N/15 mm) between the aluminum foil and the film composed of the composition 1 was measured using a 180° peel method at room temperature at 23° C. by using a tensile tester machine. A crosshead speed was set to 300 mm/min. According to a proportion of the adhesive strength of the composite after immersion in the electrolytic solution (hereinafter referred to as "adhesive strength after immersion in the electrolytic solution") to the adhesive strength of the composite immediately after production (hereinafter referred to as "initial adhesive strength"), ratings of the composites were determined and listed in Table 1. The evaluation criteria are as follows.

(Initial Adhesive Strength)

CC: Less than 3 N/15 mm

BB: 3 N/15 mm or more and less than 6 N/15 mm

AA: 6 N/15 mm or more (Resistance to Electrolytic Solution)

CC: Adhesive strength after immersion in the electrolytic solution/Initial adhesive strength, of less than 10%.

BB: Adhesive strength after immersion in the electrolytic solution/Initial adhesive strength, of 10% or more and less than 15%.

AA: Adhesive strength after immersion in the electrolytic solution/Initial adhesive strength, of 15% or more.

Examples 2 to 5 and Comparative Examples 1 to 3

Each composition was prepared in the same manner as in Example 1, except that each composition was prepared according to the formulations shown in Table 1, and each composite was produced and evaluated by using the obtained composition. The results are shown in Table 1.

TABLE 1

|  |  |  | Example 1 | Example 2 | Example 3 | Example 4 |
|---|---|---|---|---|---|---|
| Compounding ratio | PE-1 | Parts by mass | 70 |  |  |  |
|  | PE-2 | Parts by mass |  | 90 |  |  |
|  | PE-3 | Parts by mass |  |  | 15 | 15 |
|  | PE-4 | Parts by mass |  |  | 55 |  |
|  | PE-5 | Parts by mass |  |  |  | 55 |
|  | PE-6 | Parts by mass |  |  |  |  |
|  | BER-1 | Parts by mass | 30 | 10 | 30 | 30 |
| Physical properties | MFR of ethylenic polymer (A) | g/10 min | 4.0 | 4.0 | 4.0 | 4.0 |
|  | Density of ethylenic polymer (A) | g/cm³ | 0.90 | 0.92 | 0.90 | 0.92 |
|  | MFR of adhesive resin composition | g/10 min | 3.2 | 3.7 | 3.2 | 3.2 |
|  | Density of adhesive resin composition | g/cm³ | 0.90 | 0.92 | 0.91 | 0.92 |
|  | Graft modification amount | % by mass | 0.28 | 0.36 | 0.26 | 0.26 |
| Evaluation | Initial adhesive strength | — | AA | AA | AA | AA |
|  | Resistance to electrolytic solution | — | AA | AA | AA | AA |

|  |  |  | Example 5 | Comparative Example 1 | Comparative Example 2 | Comparative Example 3 |
|---|---|---|---|---|---|---|
| Compounding ratio | PE-1 | Parts by mass |  | 70 | 30 | 50 |
|  | PE-2 | Parts by mass |  |  |  |  |
|  | PE-3 | Parts by mass | 15 |  |  |  |
|  | PE-4 | Parts by mass |  | 30 |  |  |
|  | PE-5 | Parts by mass |  |  |  |  |
|  | PE-6 | Parts by mass | 55 |  |  |  |
|  | BER-1 | Parts by mass | 30 |  | 70 | 50 |
| Physical properties | MFR of ethylenic polymer (A) | g/10 min | 9.5 | 4.0 | 4.0 | 4.0 |
|  | Density of ethylenic polymer (A) | g/cm³ | 0.92 | 0.90 | 0.90 | 0.90 |
|  | MFR of adhesive resin composition | g/10 min | 9.0 | 4.0 | 2.5 | 2.8 |
|  | Density of adhesive resin composition | g/cm³ | 0.92 | 0.90 | 0.91 | 0.91 |
|  | Graft modification amount | % by mass | 0.26 | 0.28 | 0.12 | 0.2 |
| Evaluation | Initial adhesive strength | — | AA | AA | CC | CC |
|  | Resistance to electrolytic solution | — | AA | CC | CC | CC |

The invention claimed is:

1. An adhesive resin composition, comprising:
from 60 to 95 parts by mass of an ethylenic polymer (A) comprising a modified ethylenic polymer (a-2) obtained by modifying at least one polymer (a-1) selected from the group consisting of an ethylene homopolymer and a copolymer of ethylene and at least one α-olefin selected from α-olefins having from 3 to 20 carbon atoms, with an unsaturated carboxylic acid and/or a derivative thereof; and
from 5 to 40 parts by mass of a butene-based polymer (B) having 80 mol % or more of a structural unit derived from 1-butene, provided that the total content of the polymer (A) and the polymer (B) is 100 parts by mass,
wherein the adhesive resin composition has a melt flow rate as measured at 190° C. and under a load of 2.16 kg in accordance with ASTM D1238 is in a range of from 1 to 20 g/10 minutes,
wherein the butene-based polymer (B) is a copolymer of 1-butene and α-olefin(s) selected from the group consisting of ethylene and propylene.

2. The adhesive resin composition according to claim 1, wherein the melt flow rate of the ethylenic polymer (A), measured at 190° C. and under a load of 2.16 kg in accordance with ASTM D 1238 is from 0.1 to 10 g/10 minutes.

3. The adhesive resin composition according to claim 1, wherein the unsaturated carboxylic acid and/or a derivative thereof is maleic anhydride.

4. The adhesive resin composition according to claim 1, wherein the adhesive resin composition has a content of structures derived from the unsaturated carboxylic acid and/or the derivative thereof in the adhesive resin composition is from 0.05 to 1% by mass, wherein the unsaturated carboxylic acid and/or the derivative thereof is formed of maleic anhydride.

5. A monolayer or multilayer film comprising at least one layer comprising the adhesive resin composition according to claim 1.

6. The monolayer or multilayer film according to claim 5, wherein the monolayer or multilayer film is a component of a packaging film for batteries.

7. The monolayer or multilayer film according to claim 5, wherein the monolayer or multilayer film is a component of an electrode sealing material for lithium ion batteries.

\* \* \* \* \*